United States Patent [19]
Ball

[11] Patent Number: 5,249,910
[45] Date of Patent: Oct. 5, 1993

[54] VEHICLE MOUNTED SELF-LOADING AND CARRYING APPARATUS

[76] Inventor: Ronald J. Ball, 5416 Miguel Rd., Bonita, Calif. 91902

[21] Appl. No.: 884,917

[22] Filed: May 18, 1992

[51] Int. Cl.$^5$ .............................. B65G 67/02
[52] U.S. Cl. ................................. 414/538; 414/462; 114/344; 402/2
[58] Field of Search ............ 414/537, 538, 462, 373, 414/571, 572, 678, 399, 400, 401, 500; 224/310; 280/414.1, 414.2, 414.3; 405/1, 2; 114/344

[56] References Cited

U.S. PATENT DOCUMENTS

| | | | |
|---|---|---|---|
| 3,648,866 | 3/1972 | Slown | 414/462 |
| 3,726,423 | 4/1973 | Miron | 414/538 X |
| 3,734,322 | 5/1973 | Vaillancourt | 414/538 X |
| 3,927,779 | 12/1975 | Johnson | 414/538 X |
| 3,972,433 | 8/1976 | Reed | 414/462 |
| 4,212,580 | 7/1980 | Fluck | 414/538 X |
| 4,274,788 | 6/1981 | Sutton | 414/462 |
| 4,960,356 | 10/1990 | Wrenn | 414/462 X |

Primary Examiner—Frank E. Werner
Assistant Examiner—James T. Eller, Jr.
Attorney, Agent, or Firm—Lewis E. Massie

[57] ABSTRACT

A horizontal, generally rectangular frame structure constructed from aluminum, or iron, longitudinal and transverse beams mounted on the interior surface of a pick-up truck. The frame structure having one or more pairs of longitudinal boat support members, or channels, mounted on the top surface. The channels having a top cover of a low coefficient of friction plastic material are spaced to accommodate the keel structure of a jet-ski. Auxiliary pairs of channels are removably connected to the rear ends of the truck-mounted channels extending downwardly to the ground surface. An electric powered winch mounted on a vertical support on the forward portion of the frame structure accommodates a cable that is removably attached to the bow of the jet-ski. The jet-ski with its bow placed on the channels and connected to the winch cable is pulled up onto the truck body when the winch motor is energized.

1 Claim, 3 Drawing Sheets

VEHICLE MOUNTED SELF-LOADING AND CARRYING APPARATUS

BACKGROUND OF THE INVENTION

1. Field of the Invention

This invention relates to loading and transporting boats on vehicles and more particularly to an apparatus for loading and carrying a jet-ski (personal water craft) on a pick-up truck or similar vehicle.

Increasing popularity of the jet-ski and the difficulty of loading the jet-ski on a vehicle, which normally requires the effort of two or more persons to lift and secure the jet-ski, has created a demand for a simple apparatus for accomplishing the task.

2. Description of the Related Art

U.S Pat. No. 3,972,433 issued to Henry W. Reed, August, 1976, discloses a self-loading and carrying apparatus that has a frame suitable to be attached to a vehicle and includes an assembly comprising a load-carrying platform and a second supporting member telescopically carried on the first platform. Lifting means are provided to aid in raising the assembly to a horizontal position. U.S. Pat. No. 4,274,788 issued to Luther M. Sutton, June, 1981, disclosed a vehicle-mounted carriage and elevating apparatus comprising a support frame and a post frame pivotally secured to the vehicle. Actuating apparatus is secured between the support frame and the carriage and is adapted to move the carriage frame from a lower inclined position to a substantially horizontal elevated position.

SUMMARY OF THE INVENTION

A generally rectangular shaped horizontal frame structure comprises a longitudinal frame having channels extending parallel to the truck body mounted on the interior bed of pick-up truck for supporting a jet-ski in combination with a forwardly mounted electric winch. A pair of channels attachable to the vehicle boat support channels attached to the rear end of the truck mounted channels and extend to the ground. The bow portion of the jet-ski is placed on the extended channel; a flexible cable member secured to the forward winch is attached to the bow of the jet-ski. Electric power is applied to the winch pulling the jet-ski up the auxiliary rails over the friction roller onto the boat support channels. Means are provided for securing the jet-ski to the truck-mounted channels. The auxiliary loading channels are disconnected from the truck channels and stored beneath the frame structure.

DETAILED DESCRIPTION OF THE PREFERRED EMBODIMENTS

Figure 1:
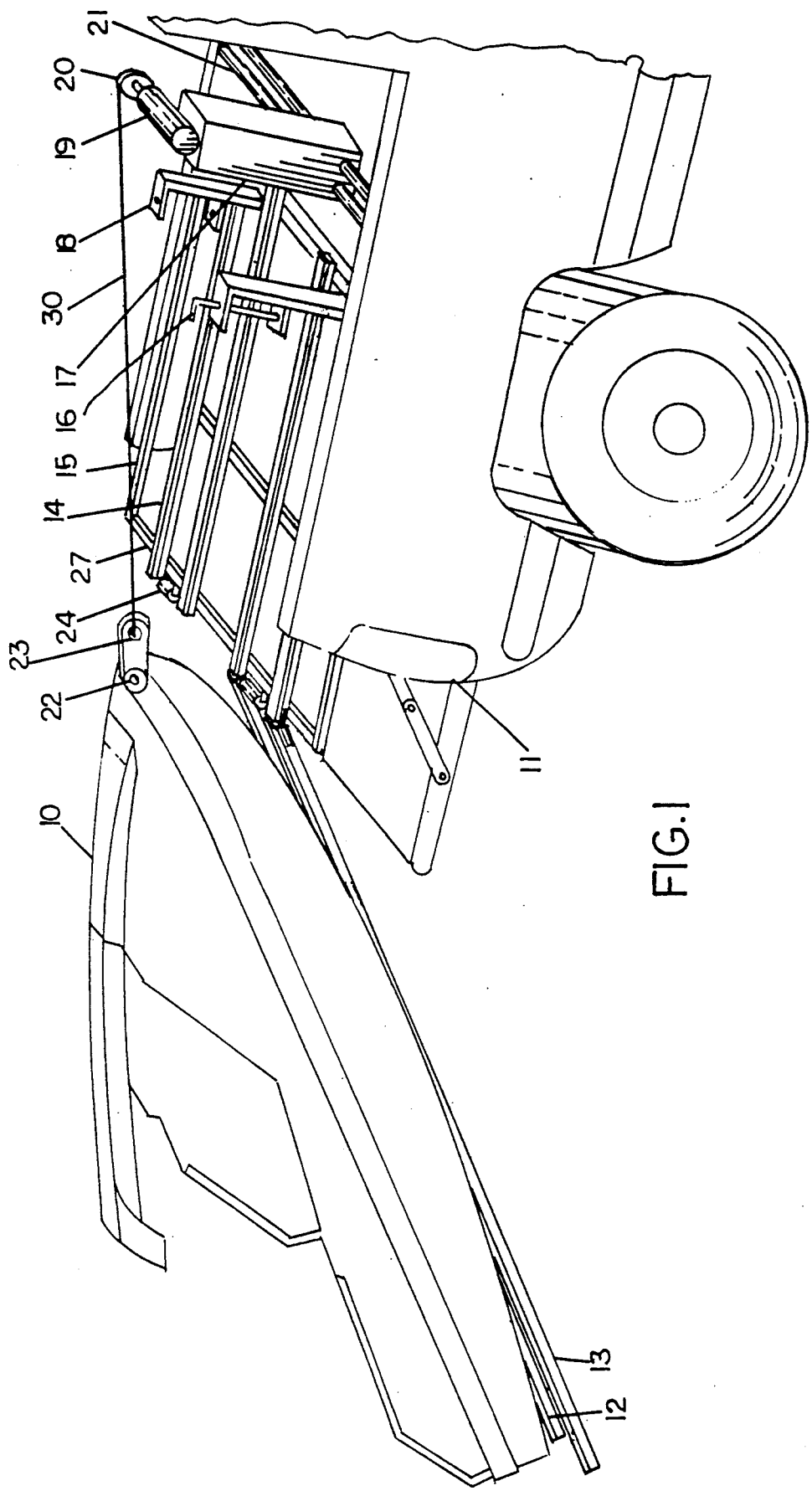
FIG. 1 is a top, right side perspective view of the support frame mounted on a pick-up truck.
Figure 2:
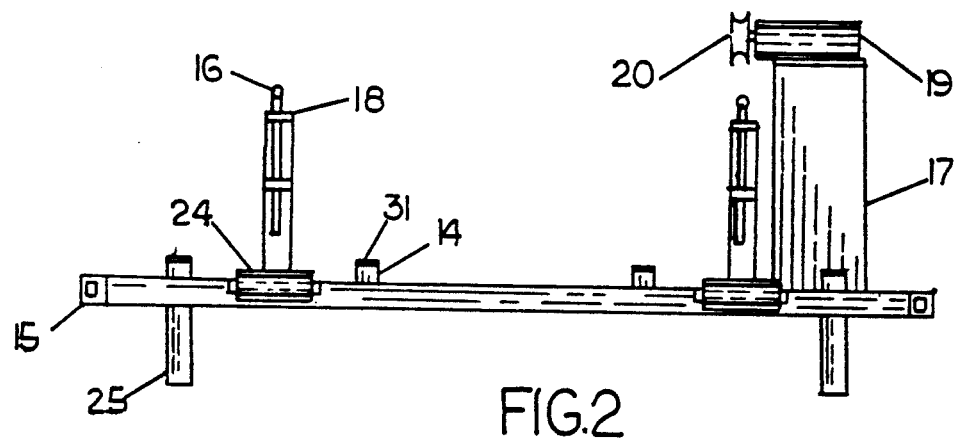
FIG. 2 is an end view of the support frame with winch support.

Referring to FIG. 1, the longitudinal extruded frame structure members 15 are shown with the transverse end member 27 mounted upon the pick-up truck 11. The longitudinal truck mounted channels are shown removably attached to loading channels 13, together with anti-friction rollers 24. A jet-ski 10 is shown mounted upon the loading channels 13 and attached at the bow 22 by swivel fitting 23 attached to flexible cable 30 to winch 20 driven by electrical motor 19. The electrical motor 19 mounted upon winch support 17 slidably mounted upon transverse rods 21. Securing pins 16 supported by structural members 18 are fastened to transverse members of the frame structure. A rear elevational view of the frame structure shown in FIG. 2 shows the longitudinal frame member 15, the vertical frame supports 25, the anti-friction rollers 24, the longitudinal channel members 14, with low friction surface 31, the winch support 17 the winch motor 19, and the winch 20. The securing pins 16 are shown attached to the support structures 18.

Figure 3:
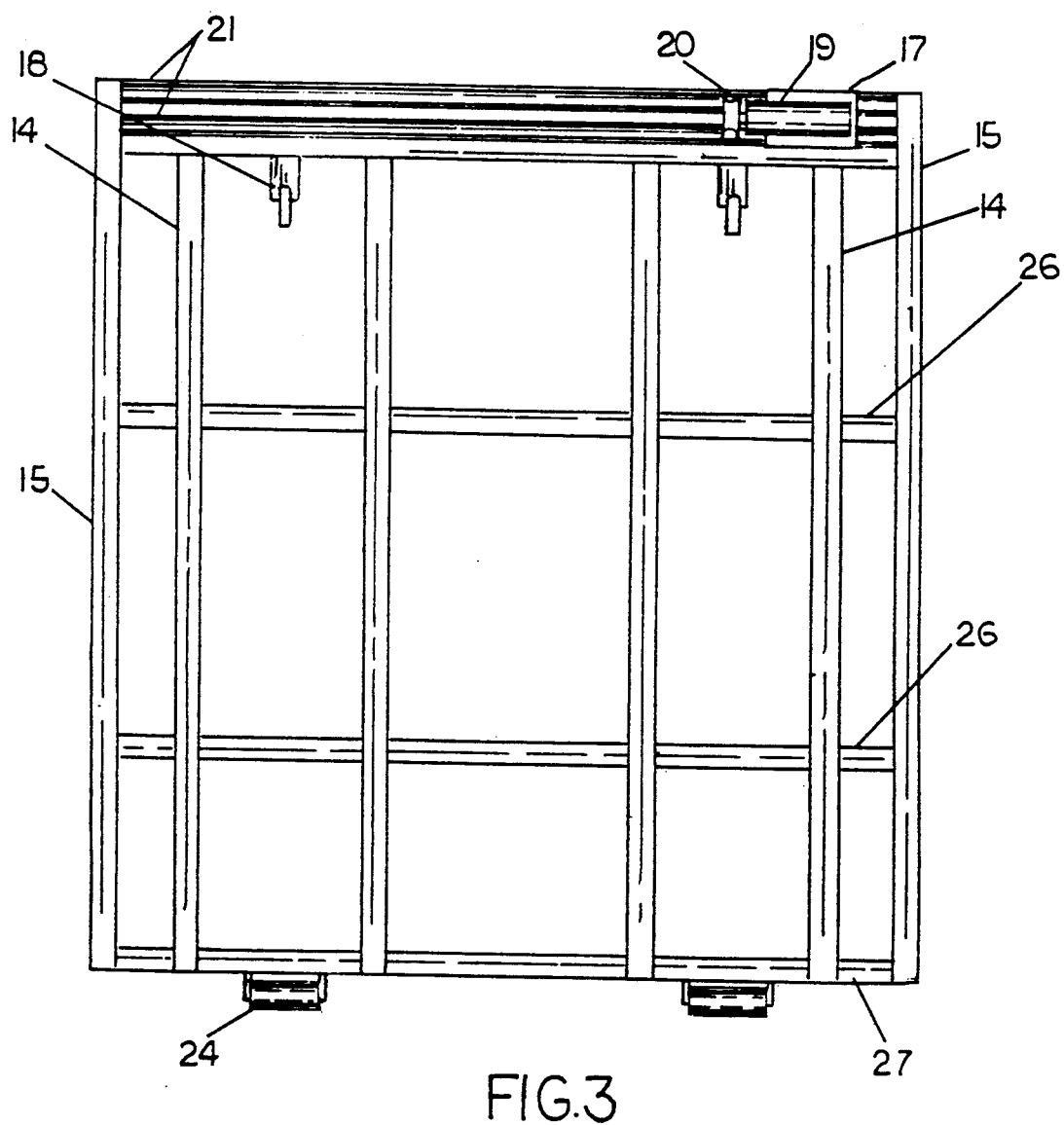
FIG. 3 is a plan view of the support frame.
Figure 4:
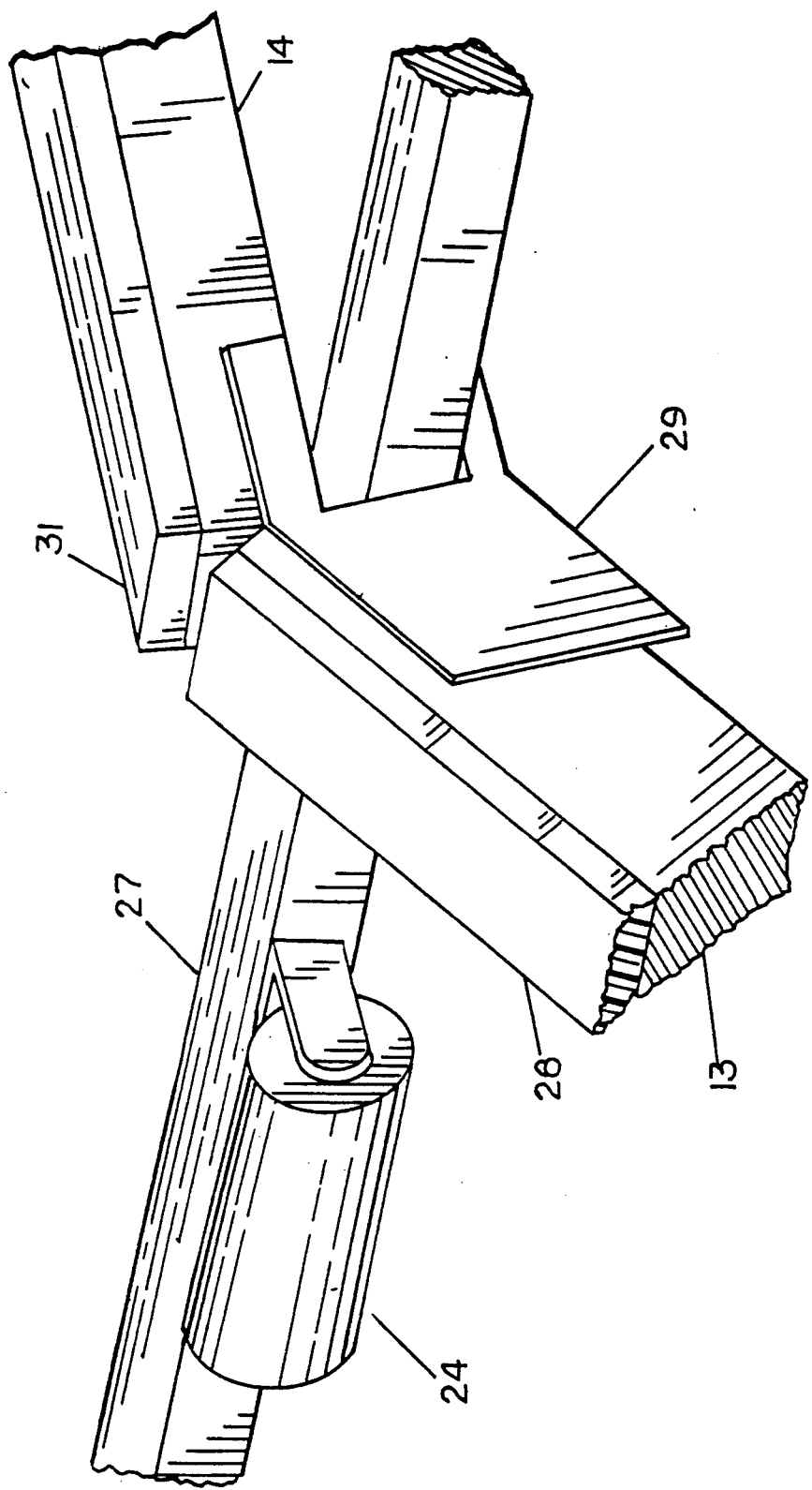
FIG. 4 is an enlarged detailed view of the removable attachment of the boat loading frame to the truck mounted frame.

A plan View of the frame structure is shown in FIG. 3. The winch support 17 with electric motor 19 and winch 20 is slidably mounted on the transverse rods 21, the tie rod supports 18, attached to transverse member 26, extending transversely between frame members 15, the longitudinal truck mounted channels 14, and the friction free rollers 24, are detailed. FIG. 4 illustrates in enlarged detail the removable loading channels 13 with low friction surface 28 attached to support yoke 29, coupled to transverse member 27 and the continuing channel 14 topped with the low friction surface 31. The friction-free roller 24 is mounted on the transverse member 27.

In use the jet-ski bow is placed upon the loading channels 13 the flexible cable is attached to the swivel member affixed to the bow of the jet-ski. Them winch motor is energized and the jet-ski is slid upwardly on the low friction top portion of the loading channel over the friction-free roller and then onto the low friction top covering of the truck-mounted channels. The bow-mounted swivel joint is then rotated to accommodate the securing pins mounted to the supports 18. The entire sequence of loading and securing the jet-ski can be performed by a single individual. All structural members of the jet-ski loading and transporting assembly to be constructed from steel or aluminum separated horizontally at the bottom end of structural member 13.

I claim:

1. An apparatus for loading and transporting a jet-ski on a pick-up truck, said jet-ski having a bow portion including a towing fixture attached thereto, said apparatus comprising:

a generally rectangular horizontal frame structure mounted in the interior portion of a bed of said pick-up truck, said frame structure constructed from a material selected from the group including aluminum and steel, said frame structure comprising a plurality of horizontal longitudinal beams, a plurality of transverse beams attached to said longitudinal beams, and a plurality of longitudinal jet-ski supporting channels supported by said transverse beams;

said frame structure further comprising two transverse rods extending between said longitudinal beams at a forward end of said frame structure, and at least one vertical attaching structure mounted at said forward end of said frame structure, said vertical attaching structure including vertical attachment pins for releasable engagement with said towing fixture for securing said jet-ski on said frame structure during transportation of said jet-ski;

a plurality of vertical support posts extending from a bottom portion of the frame to the bed of the pick-up truck for elevating the frame structure above the bed of the pick-up truck;

a plurality of auxiliary inclined jet-ski supporting channels removably connected to rear end portions of the longitudinal jet-ski supporting channels, and extending downwardly from the pick-up truck bed to the ground;

a material having a low coefficient of friction covering a top surface of each of said plurality of longitudinal and inclined jet-ski supporting channels;

an electrically powered winch having a cable for attachment to said towing fixture for pulling said jet-ski upwardly along said jet-ski supporting channels during said loading;

a vertical winch support transversely slidably attached to said two transverse rods for supporting said winch; and means for stowing said auxiliary inclined jet-ski supporting channels beneath the horizontal frame structure during transportation of said jet-ski.

* * * * *